Figure 1:
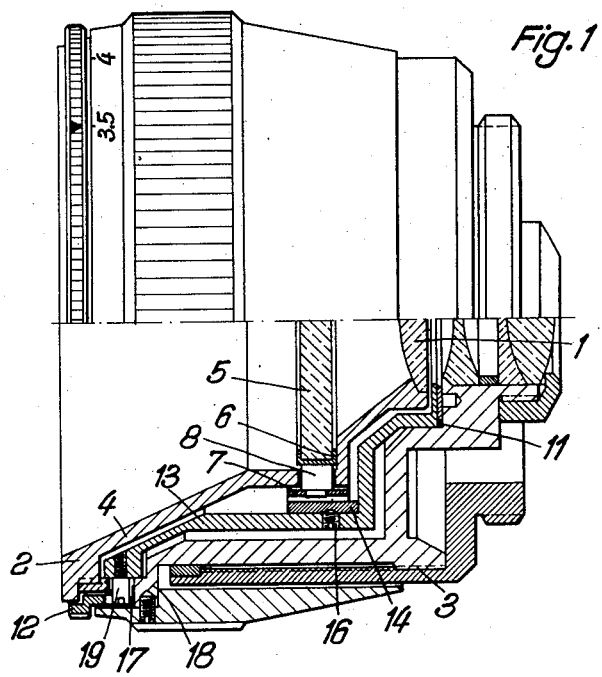

Inventor:
Peter Schmück

United States Patent Office 2,898,832
Patented Aug. 11, 1959

2,898,832

LENS MOUNT HOLDER FOR OPTICAL ELEMENTS

Peter Schmuck, Mauren, Liechtenstein, assignor to Firma Contina Bureaux- und Rechenmaschinenfabrik Aktiengesellschaft, Mauren, Liechtenstein Application August 3, 1956, Serial No. 601,977

Claims priority, application Austria August 17, 1955

5 Claims. (Cl. 95—64)

It is known to affix prearranged optical elements, such as light filters, by means of screw threads, bayonet joints or clamping devices at the front parts of the lens mount. Clamping devices are attached in most cases on the prearranged element itself and serve to clamp the same to a cylindrical surface of the lens mount.

Lenses, particularly of small focal length, are known, in which the front parts of the mount protrude substantially beyond the foremost component lens. In these lenses the prearranged optical elements were affixed to the readily accessible foremost parts of the mount. As a result a large distance was created between the prearranged optical element and the front lens. For microphotographs, therefore, these prearranged optical elements substantially spaced from the front component lens cannot be used because they are too close to the object and to the range of definition. Furthermore, any reflux images formed on the prearranged elements or impurities deposited on them will exercise a disturbing influence on the picture because they will also form an image on the light-sensitive material.

The present invention is to enable the fixation of a prearranged optical element to lens mounts having mount parts which protrude far beyond the front component lens and in a position directly before the front component lens. The solution to this problem resides, according to the invention, in that based on holding means for prearranged optical elements in a lens mount having mount portions which protrude beyond the front component lens, the holding device for the prearranged optical element is disposed within said mount parts and directly before the front component lens and is arranged to be operable by an actuating member disposed on the outside of the lens.

In these arrangements the part of the lens mount which protrudes beyond the front component lens forms in most cases a funnel, which opens into the support for the prearranged element, which support is provided with the clamping device. When the prearranged optical element is inserted in the lens mount, it will automatically slide onto its support when the clamping device is opened. To remove the prearranged optical element from the lens mount, the element is allowed to fall out after the clamping device is opened, whereafter the prearranged optical element is caught.

The exchange of the prearranged optical element is greatly facilitated if in a development of the invention the holding device is constructed to be operable by a rotary movement coaxial with the lens axis. First of all, this enables the use of a setting member which exists already, particularly for setting the lens, e.g. a diaphragm adjusting ring, for actuating the clamping device, in that this ring will operate the clamping device against a releasable or resilient stop by movements effected outside its normal range of rotation, before or behind end positions of the rotary movement which are defined by certain f- numbers. The main part of the holding device may consist of a curved leaf spring so that a change in the curvature of that spring may be used to cause the prearanged optical element to be clamped or released.

The drawing shows an illustrative embodiment of a lens mount formed according to the invention, in which a clamping device for a prearranged optical element consisting of a filter is actuated by the diaphragm setting ring. More specifically, Fig. 1 is a longitudinal sectional view of the lens mount arrangement with the light filter inserted therein; and Fig. 2 is a sectional view of the clamping device taken at right angles to the lens axis.

Figure 2:
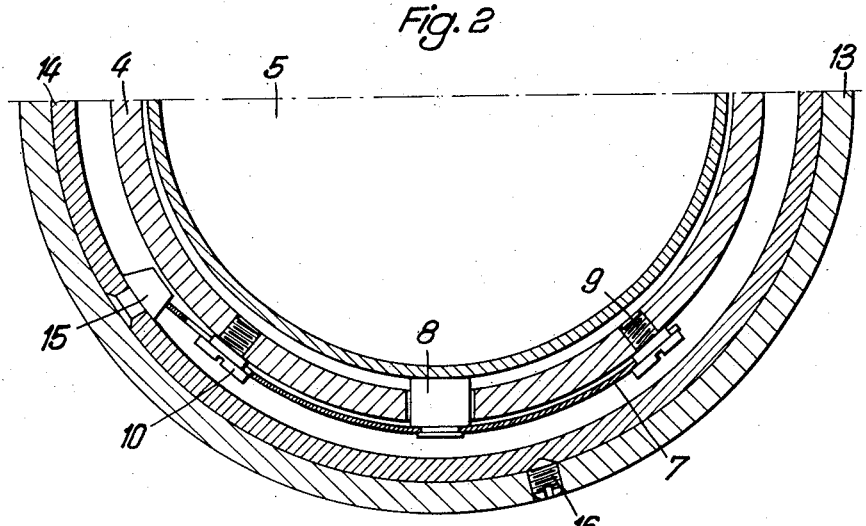

Fig. 1 shows a lens mount arrangement having a mount part 2 which protrudes considerably beyond the front component lens 1. The amount is arranged within a tubular lens mount which, in turn, is arranged interiorly of a tubular lens mount carrier. That design is chosen particularly for lenses used for microphotographs in order to enable the accommodation of the worm gear drive 3 required for a long extension which worm gear drive allows the lens mount and lens mount carrier to be adjusted axially relative to each other. The front part 4 of the mount is shaped like a funnel and opens into the support 6 provided for a removable optical accessory element such as the light filter 5. The clamping device consists of a curved leaf spring 7, which has a clamping element or jaw 8 riveted thereto and is affixed by means of the screws 9, 10 to the front part 4 of the mount. The leaf spring 7 has an oblong hole at the screw 10 and is movably arranged below the same.

The iris diaphragm 11 is operable by a turning of the diaphragm setting ring 12, whose rotation is transmitted by the ring or sleeve 13 to the diaphragm blades. The ring 13 accommodates an abutment element or ring 14, which has an abutment dog 15. After the clamping device has been set the abutment ring 14 is firmly connected to the ring 13 by the screw 16.

The slot 17 in the mount member 18 coacts with the screw 19 to determine the limits of rotation of the diaphragm. That slot is somewhat longer on one side so that when, e.g., the largest diaphragm opening has been reached the screw 19 will not engage the slot 17 but the leaf spring 7 will engage the abutment dog 15 (Fig. 2). This engagement will have necessary strength if the leaf spring 7 is of sufficient thickness.

The clamping device is opened by turning the diaphragm ring 12 against that resilient abutment so that a curvature of the leaf spring 7 and a lifting of the clamping jaw 8 from the light filter 5 is effected. In order to prevent an excessive deflection of the leaf spring 7 the slot 17 coacts with the screw 19 to limit the rotary movement necessary for opening the clamping device. The closing of the clamping device is automatically effected by the leaf spring 7 springing back to its original position, i.e., due to the fact that the clamping means are continuously urged to a position in which the optical element 5 is locked in position on the seat formed by the shoulder 6.

It will be understood that this invention is susceptible to modification in order to adapt it to different usages and conditions, and, accordingly, it is desired to comprehend such modifications within this invention as may fall within the scope of the appended claims.

What is claimed is:

1. In a lens mount arrangement for photographic cameras and adapted to be equipped with optical attachments, the combination of: a tubular lens mount carrier; a tubular lens mount arranged interiorly of said carrier, said lens mount and lens mount carrier being connected for axial movement relative to each other; a front component lens arranged in said lens mount; a mount part arranged within said lens mount and protruding beyond said front component lens and having an annular shoulder adapted to form a seat for an optical element, said shoulder being located forwardly of said front component lens intermediate the ends of said lens mount; clamping means on said mount part for locking a removable optical accessory element in position on the seat formed by said shoulder, said clamping means being continuously urged to a clamping position in which the optical element is locked in position on said seat; a rotatable adjusting ring arranged exteriorly of said lens mount; and connecting means interconnecting said adjusting ring and said clamping means in such a manner that rotation of said ring in one direction will cause said clamping means to release the optical element and rotation in the opposite direction will permit said clamping means to assume its clamping position so that the optical element will be locked in position on said seat, whereby the optical element may be locked and released from a point exteriorly of said lens mount irrespective of the axial position of said lens mount within said lens mount carrier without necessitating access to said clamping means through the wall of said tubular lens amount or the wall of said tubular lens mount carrier.

2. The combination defined in claim 1 wherein said mount part is frusto-conical and wherein said shoulder is formed near the smaller end of said frusto-conical mount.

3. The combination defined in claim 1 further comprising a diaphragm which is so connected to said connecting means that rotation of said ring causes adjustment of said diaphragm.

4. The combination defined in claim 1 wherein said mount part is formed with an opening therethrough at said shoulder; wherein said clamping means comprise a clamping element arranged in said opening and being radially movable therein, a curved leaf spring arranged exteriorly of said mount part and being attached thereto at one end so that longitudinal movement of said leaf spring is prevented, said clamping element being connected to said leaf spring intermediate the ends of the latter; and wherein said connecting means comprise an abutment element which when said ring is rotated in said opposite direction into a releasing position engages the free end of said leaf spring so as to increase the curvature thereof, thereby moving said clamping element outwardly to release an optical element seated at said shoulder, the optical element remaining clamped against its seat in all other positions of said ring.

5. In a lens mount arrangement for photographic cameras and adapted to be equipped with optical attachments, the combination of: a tubular lens mount carrier; a tubular lens mount arranged interiorly of said carrier, said lens mount and lens mount carrier being connected for axial movement relative to each other; a front component lens arranged in said lens mount; a mount part arranged within said lens mount and protruding beyond said front component lens and having an annular shoulder adapted to form a seat for an optical element, said shoulder being located forwardly of said front component lens intermediate the ends of said lens mount; clamping means on said mount part for locking a removable optical accessory element in position on the seat formed by said shoulder; an adjustable diaphragm arranged on said lens mount in optical alignment with said front component lens; a rotatable adjusting ring arranged exteriorly of said lens mount; a connecting sleeve interconnecting said ring and said diaphragm so that the latter may be adjusted upon rotation of the former; and connecting means interconnecting said sleeve and said clamping means in such a manner that upon rotation of said ring beyond the range within which adjustment of said diaphragm is effected, said clamping means will be so actuated as to release an optical element clamped on its seat, whereby the optical element may be locked and released from a point exteriorly of said lens mount irrespective of the axial position of said lens mount within said lens mount carrier, without necessitating access to said clamping means through the wall of said tubular lens mount or the wall of said tubular lens mount carrier.

References Cited in the file of this patent

UNITED STATES PATENTS

| 1,057,262 | Oldfield | Mar. 25, 1913 |
| 1,417,526 | Howell | May 30, 1922 |
| 2,241,596 | Guhl | May 13, 1941 |

FOREIGN PATENTS

| 290,780 | Great Britain | May 24, 1928 |
| 185,684 | Austria | May 25, 1956 |